US010427385B2

United States Patent
Wilson et al.

(10) Patent No.: US 10,427,385 B2
(45) Date of Patent: Oct. 1, 2019

(54) LOW REFLECTANCE OPTICAL WEB

(71) Applicant: Racing Optics, Inc., Las Vegas, NV (US)

(72) Inventors: Bart E. Wilson, Las Vegas, NV (US); Stephen S. Wilson, Las Vegas, NV (US)

(73) Assignee: Racing Optics, Inc., Las Vegas, NV (US)

( * ) Notice: Subject to any disclaimer, the term of this patent is extended or adjusted under 35 U.S.C. 154(b) by 144 days.

(21) Appl. No.: 15/663,062

(22) Filed: Jul. 28, 2017

(65) Prior Publication Data

US 2018/0029337 A1 Feb. 1, 2018

Related U.S. Application Data

(60) Provisional application No. 62/367,845, filed on Jul. 28, 2016.

(51) Int. Cl.
| | |
|---|---|
| *B32B 17/10* | (2006.01) |
| *G02B 1/11* | (2015.01) |
| *G02B 1/111* | (2015.01) |
| *G02B 1/115* | (2015.01) |
| *B32B 27/30* | (2006.01) |

(Continued)

(52) U.S. Cl.
CPC ........ *B32B 17/10981* (2013.01); *C08J 7/047* (2013.01); *C09C 1/0021* (2013.01); *C09J 7/22* (2018.01); *C09J 7/38* (2018.01); *G02B 1/115* (2013.01); *G02B 1/14* (2015.01); *G02B 5/1861* (2013.01); *C09J 2201/622* (2013.01);
(Continued)

(58) Field of Classification Search
None
See application file for complete search history.

(56) References Cited

U.S. PATENT DOCUMENTS

| | | |
|---|---|---|
| 4,333,983 A | 6/1982 | Allen |
| 4,716,601 A | 1/1988 | McNeal |

(Continued)

FOREIGN PATENT DOCUMENTS

WO 2015/093413 A1 6/2015

OTHER PUBLICATIONS

"Anti-reflective coating," Wikipedia, last updated Jul. 13, 2017 by Andy Dingley, https://en.m.wikipedia.org/wiki/Anti-reflective_coating.
"Monotonic function," Wikipedia, accessed May 24, 2017, https://en.wikipedia.org/wiki/Monotonic_function.
"Thin Film," Wikipedia, last updated Jun. 20, 2017, https://en.wikipedia.org/wiki/Thin_film.
"Tips to Get Quality Anti-Reflection Optical Coatings," Penn Optical Coatings, accessed May 24, 2017, http://www.pennoc.com/tipsgetqualityantireflectionopticalcoatings/.
(Continued)

*Primary Examiner* — Tae H Yoon
(74) *Attorney, Agent, or Firm* — Fitch, Even, Tabin & Flannery, LLP

(57) ABSTRACT

An optical web comprising includes a substrate with an anterior coating applied to the anterior side of the substrate and a posterior coating applied to the posterior side of the substrate. The refractive index of the anterior coating and the posterior coating is less than that of the substrate. A second coating layer may be applied to the anterior coating layer and/or the posterior coating layer, where the second coating layer has a refractive index less than that of the coating layer it is applied to. Additional coating layers may be applied to produce a stack of layers that decrease monotonically in refractive indexes moving outward from the substrate. The optical webs may be laminated together to form tear-off laminated lens stacks.

35 Claims, 6 Drawing Sheets

(51) Int. Cl.
  *B32B 27/36*  (2006.01)
  *C08J 7/04*  (2006.01)
  *C09C 1/00*  (2006.01)
  *G02B 5/18*  (2006.01)
  *C09J 7/38*  (2018.01)
  *C09J 7/22*  (2018.01)
  *G02B 1/14*  (2015.01)

(52) U.S. Cl.
  CPC ...... *C09J 2203/318* (2013.01); *C09J 2433/00* (2013.01); *C09J 2483/00* (2013.01)

(56) References Cited

U.S. PATENT DOCUMENTS

| | | | |
|---|---|---|---|
| 7,722,921 B2* | 5/2010 | Shimoda | G02B 1/111 |
| | | | 427/162 |
| 9,575,231 B2* | 2/2017 | Chu | G02B 5/281 |
| 2005/0015860 A1 | 1/2005 | Reaux | |
| 2006/0056030 A1 | 3/2006 | Fukuda et al. | |
| 2009/0239048 A1* | 9/2009 | Sugihara | G02B 1/041 |
| | | | 428/212 |
| 2011/0168261 A1 | 7/2011 | Welser et al. | |
| 2012/0200816 A1 | 8/2012 | Krasnov | |
| 2013/0247286 A1 | 9/2013 | VanderWoude et al. | |
| 2015/0359675 A1 | 12/2015 | Wilson | |
| 2016/0259102 A1 | 9/2016 | Taka | |

OTHER PUBLICATIONS

Langlet, M., "Antireflective Films", from Chapter 15 of Handbook of Sol-Gel Science and Technology Processing Characterization and Applications, copyright 2005, pp. 332-334, 337, 339-341., taken from website https://books.google.com/books?id=i9swy1D2HxIC&lpg=PA339&dq=AR%20thick%20film%20coatings&pg=PA339#v=onepage&q=AR%20thick%20film%20coatings&f=false.

Li, H.-M. et al., "Influence of weight ratio in polymer blend film on the phase separation structure and its optical properties", The European Physical Journal Applied Physics, 45, 20501, published Jan. 31, 2009, EDP Sciences, 4 pages.

Zhang, Xin_Xiang et al., Abstract of "One-step sol-gel preparation of PDMS-silica ORMOSILs as environment-resistant and crack-free thick antireflective coatings," Journal of Materials Chemistry, Issue 26, 2012, http://pubs.rsc.org/en/content/articlelanding/2012/jm/c2jm31005h#!divAbstract.

PCT International Search Report and Written Opinion of the International Searching Authority dated Oct. 23, 2017 for International Application No. PCT/US2017/044438, 12 pages.

MDS Nordion, "Gamma Compatible Materials," Datasheet, Aug. 2007, 4 pages, [online], [retrieved on Sep. 20, 2017] <URL: https://ab-div-bdi-bl-blm.web.cern.ch/ab-div-bdi-bl-blm/Radiation/Gamma_Compatible_Materials_List_company.pdf>.

* cited by examiner

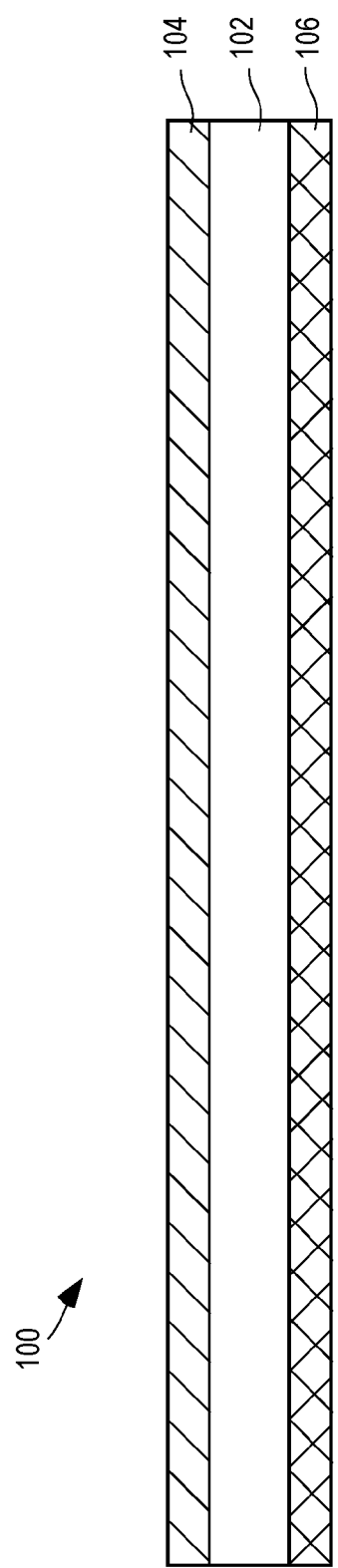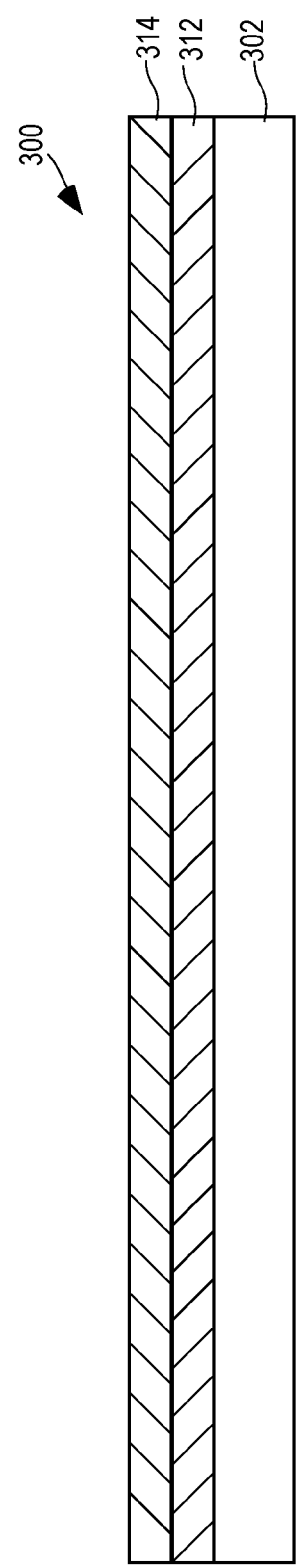

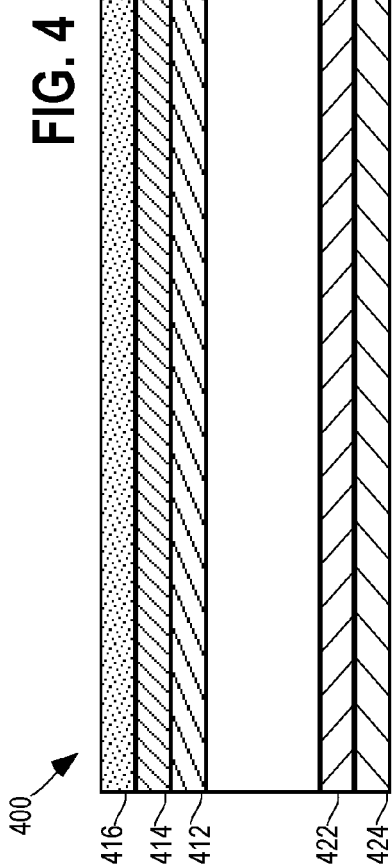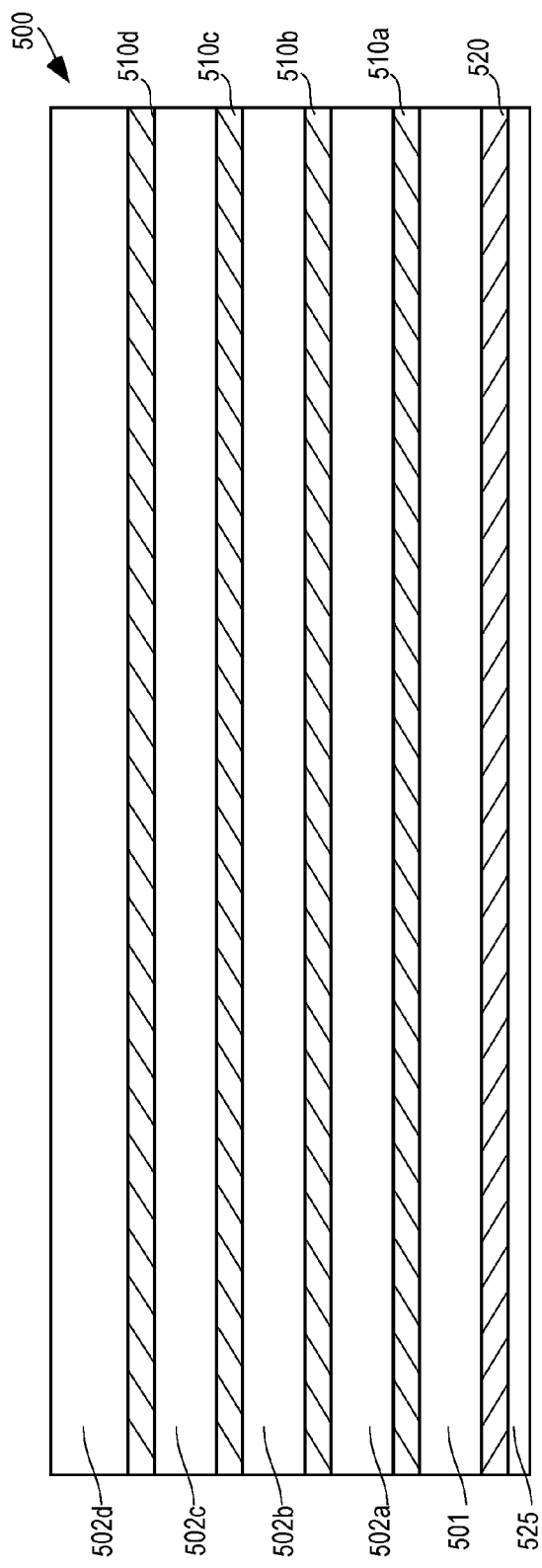

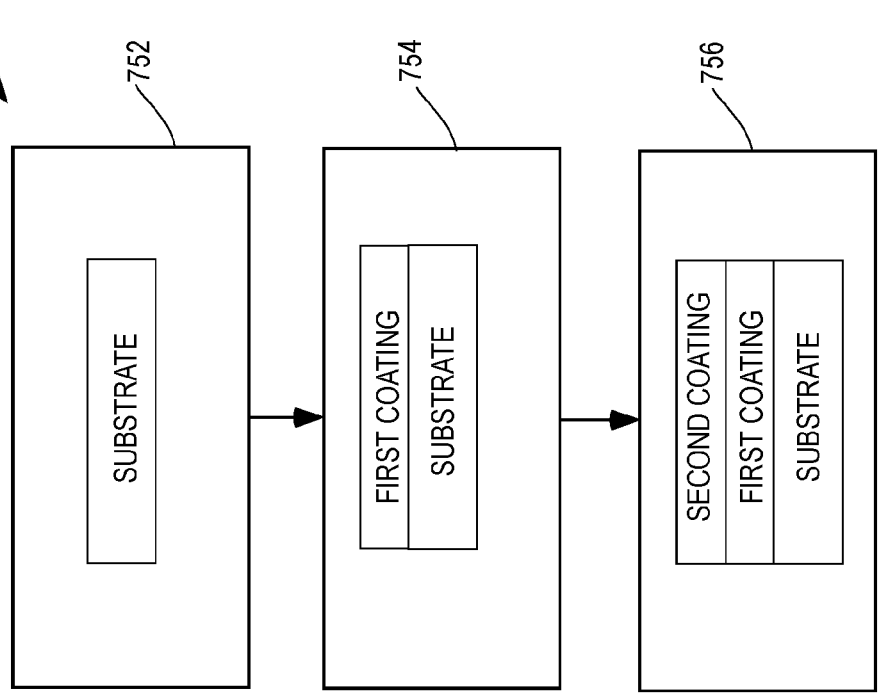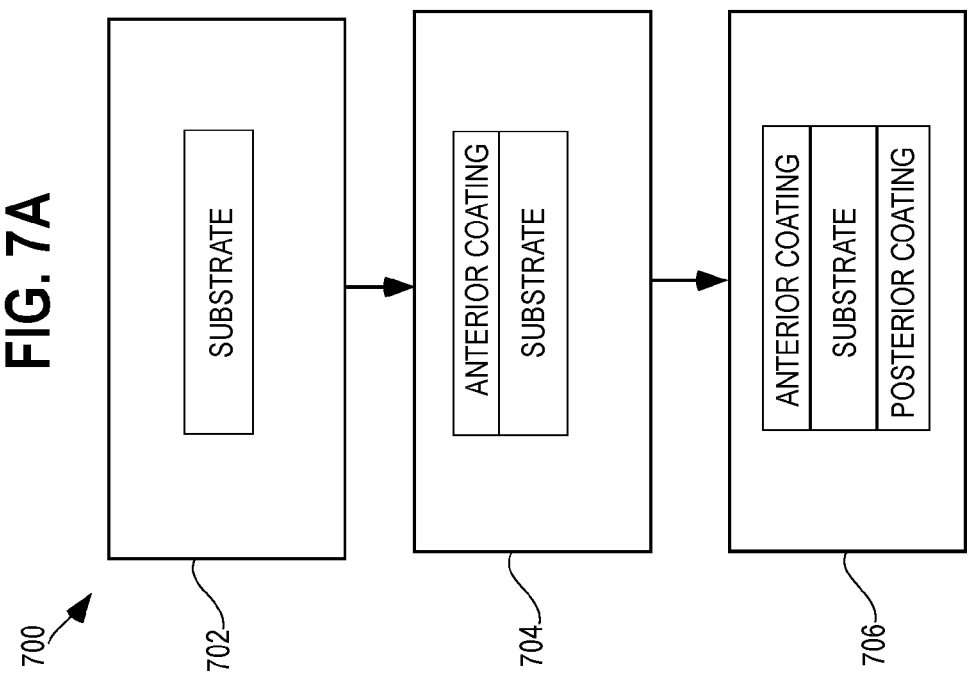

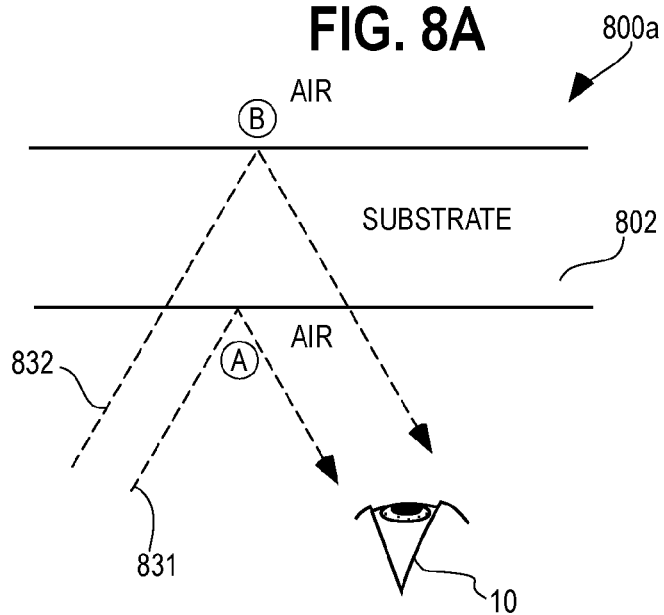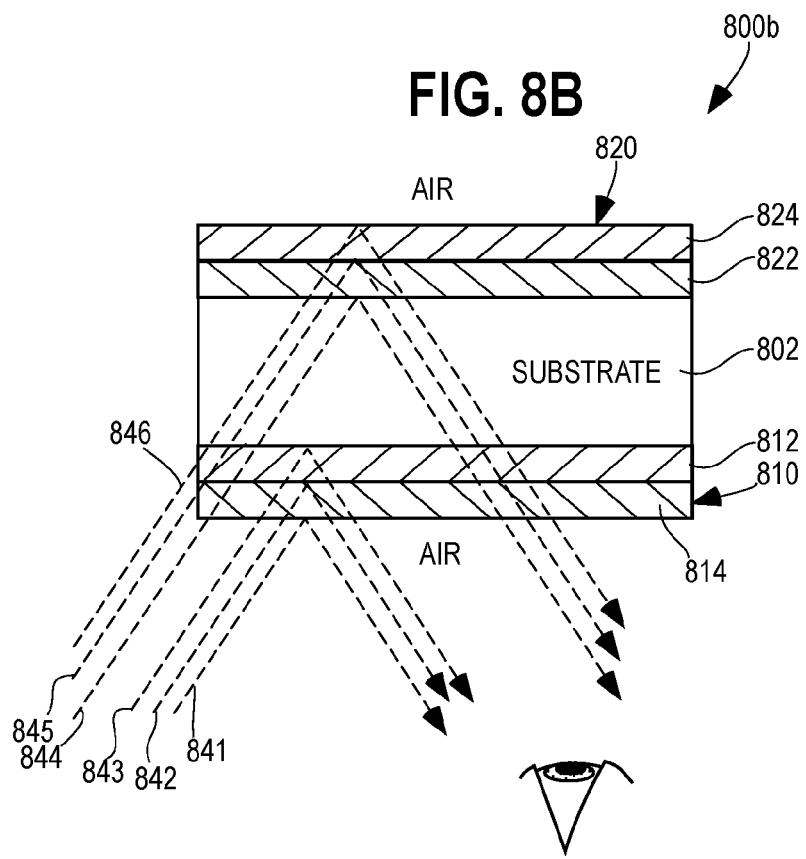

LOW REFLECTANCE OPTICAL WEB

RELATED APPLICATIONS

This application claims the priority benefit of U.S. provisional patent application No. 62/367,845, titled "Screen Protector," which is hereby incorporated by reference in its entirety.

TECHNICAL FIELD

This application generally relates to optical webs. More specifically, the present disclosure relates to optical webs coated with non-thin film coatings to reduce reflectance.

BACKGROUND

Optical windows can be used to protect the face and eyes of a wearer from spatter, debris, and other projectiles that can cause harm to a wearer's face and eyes while still allowing the wearer to see clearly through the window. For example, helmets, face masks, goggles, windshields and the like are used in a variety of different environments, such as in racing (e.g., horse, auto, motorcycle, bike, etc.), workshops and laboratories, and surgical environments, to name but a few. In many of these environments, spatter and other debris can accrue on the eyewear, thereby occluding the field of vision for a user. Moreover, in addition to the issues caused by a soiled window, glare caused by the reflections of light off the window can also inhibit the wearer's ability to see clearly. In many of these environments, such visual imparities can present serious health and safety issues. For instance, in environments that involve high speed travel (e.g., racing), or complicated technical endeavors (medical procedures), visual obstructions caused by spatter or glare can have a negative impact on performance and result in untimely accidents or errors that can pose serious risks.

Regarding visibility issues caused by spatter and debris, it is not always possible or effective to simply wipe away the spatter to clear the field of vision. For instance, racers and surgeons frequently will not have a free hand or a towel available to wipe their eyewear clean, and even if they did, such wiping could still smear or leave behind residue that could occlude the field of vision. One technique for helping such individuals clear their field of vision involves providing tear-off lenses on the eye protector. In this way, wearers can remove an outer-most tear-off lens layer when it becomes soiled, thereby exposing a clean layer underneath to provide a clear field of vision. More tear-off lenses on the eyewear provide more opportunities for the wearer to clear their field of vision; however, each layer in a tear-off lens stack can further contribute to the glare generated.

Glare and reflectance off an optical surface can be reduced by employing anti-reflective coating (AR coating) on the optical surface. AR coatings typically consist of many transparent thin film structures that have alternating layers of contrasting refractive index. In this sense, "thin films" is not a relative term, but instead refers to films that have a thickness that is on the order of half the wavelength of visible light, or less. For instance, thin films may refer to films having a thickness of between 50 nm to 250 nm (0.05 microns to 0.25 microns) or even thinner. The thin film layers are chosen to make up the AR coating are selected to produce destructive interference in the beams reflected from the surfaces and constructive interference in the corresponding transmitted beams. While these AR coatings can be effective in reducing reflections, they are also expensive to produce and apply. For example, the thin film AR coatings are typically applied either in a vacuum environment or by spin coating. However, vacuum environments for processing are very expensive and preclude commercial use of large area disposable lenses. And spin coating is suitable for application on small, round substrates having an area less than one square foot, but is not viable for web processing. In addition, thin film AR coatings are subject to color shift, such that when viewed at angles, the AR coatings tend to provide a colored hue or tint (e.g., a violet hue), which may undesirably take away from viewing in environments where clear vision is paramount. Accordingly, using AR coatings to reduce glare on optical webs or products formed therefrom, on laminated material such as tear-off lens stacks, or on other disposable materials such as disposable shields and windows, is not a cost effective technique for reducing reflections.

SUMMARY

This application describes examples of optical webs and related methods of manufacture and use. The optical webs comprise one or more layers that can be applied to or used as a protective eyewear or other protective optical structure, such as goggles, a face shield, a mask, a helmet, glasses, a window, a windshield, or the like. The optical webs are designed to reduce, limit, minimize, or otherwise reduce the glare or reflections off and through the webs.

Generally speaking, the optical webs include a substrate layer and a coating stack applied to one or both sides of the substrate. The coating stacks may include one or more optical coating layers. The substrate has a refractive index that, by itself, would reflect a certain amount of light resulting in glare when viewed. The coating stacks are arranged with optical coating layers that have a lower refractive index than that of the substrate. The coatings are arranged so that no air or other surfaces are applied between the various layers. Where the coating stack includes multiple coating layers, the refractive indexes of each of the optical coating layers are selected so that the refractive indexes decrease monotonically from the substrate to the outer surface (i.e., the refractive index decreases from layer to layer moving from the substrate outward, without increasing). Thus, each outwardly successive optical coating layer has a lower refractive index than that of the coating layer it is applied to. In this way, the outermost coating layer has the lowest refractive index of the coating stack. This monotonic decreasing refractive index helps reduce the glare generated by the optical web. That is, the glare generated by the optical web is lower than the glare that would result from the substrate by itself. The web can be provided as a sheet or roll, or it may be cut to shape, for example, to the shape of a window, screen, shield, or other structure.

In some examples, the optical webs are used to form multi-layer laminated material. The multi-layer material can include two or more layers of the optical webs described above laminated together with a peelable adhesive so that the layers can be released from the stack. In this way, the multi-layer material can be cut into multi-layer stacks, which can then be used as a multi-layer window, or applied thereto. In operation, when desired (e.g., when it becomes soiled), the outermost layer of the stack can be peeled or torn away to reveal a clean subsequent layer, thereby providing a clear field of vision. In some examples, the stack includes multiple layers that are all of the same as one another (e.g., multiple layers of the optical webs described above laminated to one another), but in other examples the layers of the stack can be different. For example, the stack may include a base layer that has a thickness greater than that of the other layers, thereby providing rigidity to the stack so that the stack can be used as a window or shield. The multi-layer laminated material can be provided as a sheet or roll of material, or it can be cut to a shape, for example, the shape of a shield or window. In some instances, the shield can be sterilized (e.g., using gamma sterilization) and coupled to a garment, such as a medical garment, where it can be used in a sterile medical environment.

BRIEF DESCRIPTION OF THE DRAWINGS

FIG. 2 is a side elevation view of the optical web of FIG. 1.

FIG. 3 is a side elevation view of an optical web coated with a coating stack in accordance with examples described herein.

FIG. 4 is a side elevation view of an optical web coated with coating stacks on anterior and posterior sides in accordance with examples described herein FIG. 5 is a side elevation view of an optical web comprising a stack of laminated optical layers in accordance with examples described herein.

FIG. 7A is a diagram depicting a method for manufacturing an optical web in accordance with examples described in this application.

FIG. 7B is a diagram depicting another method for manufacturing an optical web in accordance with examples described herein.

FIGS. 8A and 8B are diagrams demonstrating the effect of the reflectance of light for an uncoated substrate and an optical web material coated with multiple coating stacks.

DETAILED DESCRIPTION

Figure 1:
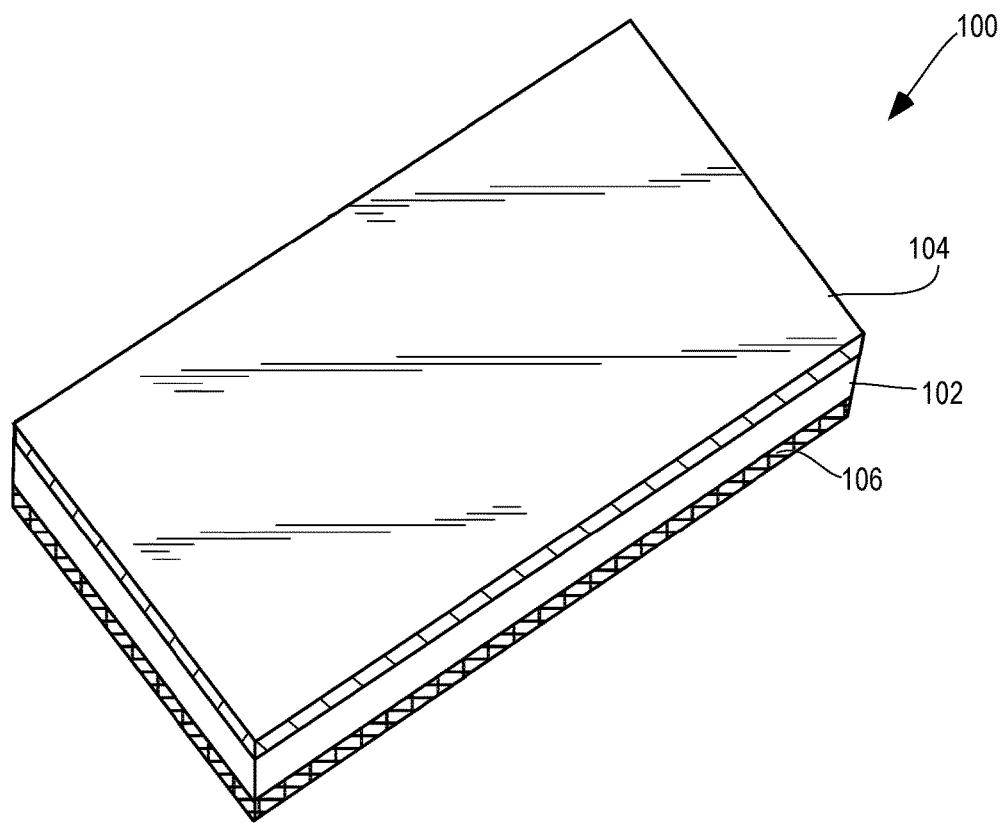
FIG. 1 is a perspective view of an optical web in accordance with examples described in this application.

This application describes examples of optical webs and related methods of manufacture and use. The optical webs comprise multiple layers, including a base substrate, and at least one coating layer. The refractive indexes of the various layers decrease monotonically from the substrate outward, at least in one direction. That is, the coating layer applied directly to the substrate will have a lower refractive index than the substrate, and any coating layer applied thereto will have yet an even lower refractive index, as will each successive coating layer. The coatings and coating stacks can be applied to one or both sides of a substrate. This configuration allows for an optical web to reduce reflections and glare over the substrate material by itself without relying on expensive and difficult to apply thin film coatings.

The described optical webs can be made without employing expensive and fragile thin films or AR coatings. That is, the coating layers and substrate can be made at thicknesses that are less expensive to produce and assemble than the thin films forming AR coatings. In general, the coating layers applied to the substrate can be at least four times thicker wavelength of visible light. In some cases, the coating layers can be at least 2 microns thick (i.e., 2 micrometers or 2000 nm thick); however, depending on the intended application and use and tolerance for cost, the coatings can be even thinner, for example 0.5 microns. In general, the described coating layers can achieve glare reduction using principles of refraction and Snell's law without addressing or dealing with thin film interference issues.

While the described optical webs can be made without using thin film coatings, certain examples may still apply such thin film AR coatings to the webs. For instance, some webs may include an AR coating applied directly to a substrate surface opposite the other coated surfaces, and in other cases, webs may include an AR coating on top of an outermost coating layer to provide additional anti-glare benefits. For instance, this application claims priority to, and incorporates by reference U.S. provisional patent application No. 62/367,845, titled "Screen Protector," which describes applying an AR coating applied to an underside or interior surface of a web product that is used as a screen protector. Examples of such a screen protector are further described below.

Snell's law (also known as the law of refraction) presents formulas that describe the relationship between the angles of incidence and refraction, when referring to light or other waves passing through a boundary between two different isotropic media, such as water, air, glass, polymers, or other substances. In optics, the law is used to compute the angles of incidence or refraction, and in experimental optics to find the refractive index of a material. The refractive index of a medium is a representation of how light propagates through the medium, and is represented by the equation:

$$n = c/v$$

where n is the refractive index of the medium, c is the speed of light in a vacuum, and v is the phase velocity of the light medium. Generally, a higher refractive index means that light travels slower through the medium.

Snell's law states that the ratio of the sines of the angles of incidence and refraction is equivalent to the ratio of phase velocities in the two media, or equivalent to the reciprocal of the ratio of the indices of refraction. At an interface between two different media (e.g., a substrate and air, a substrate and a coating, a film and an adhesive, etc.) the interface will reflect a percentage of light, and that percentage depends upon the difference between the refractive indexes of the two media and the angles of incidence and refraction. In general, the larger the difference between the refractive indexes of two media forming the interface, the more light the interface will reflect. For the case of normal incidence, where the angle of incidence and refraction are both zero, reflectance can be measured by squaring the quotient of the difference between the refractive indexes of the two materials and their sums. In other words, reflectance can be represented by the following equation:

$$R = \left| \frac{n_1 - n_2}{n_1 + n_2} \right|^2$$

Where R is the reflectance, and $n_1$ and $n_2$ are the respective refractive indexes of the two materials forming the interface.

Typically, the index of refraction of air is about 1 (more specifically, it is about 1.0003). Because air is a medium through which light travels, the surface of any optical substance creates an interface that will reflect and refract light. And for materials used as a window, the material will form two interfaces with air—on the anterior and posterior side of the medium—thereby contributing to reflectance and glare twice. Table 1 applies the normal incidence equation above to demonstrate the percentage of light that will be reflected by a material having a particular refractive index (RI) when viewed through air.

TABLE 1

| RI of Material | RI of Air | Reflectance % From One Surface | Total Reflectance From Two Surfaces |
|---|---|---|---|
| 1.00 | 1.00 | 0 | 0.000% |
| 1.30 | 1.00 | 1.701% | 3.403% |
| 1.35 | 1.00 | 2.218% | 4.436% |
| 1.40 | 1.00 | 2.778% | 5.556% |
| 1.45 | 1.00 | 3.374% | 6.747% |
| 1.50 | 1.00 | 4.000% | 8.000% |
| 1.55 | 1.00 | 4.652% | 9.304% |
| 1.60 | 1.00 | 5.325% | 10.651% |
| 1.65 | 1.00 | 6.016% | 12.033% |
| 1.70 | 1.00 | 6.722% | 13.443% |

As shown in Table 1, not only do greater differences in refractive index produce greater reflectance, the increase in reflectance is not linear. That is, a difference in refractive index of 0.3 results in a total reflectance of 3.4%, but doubling that difference to 0.6 results in a total reflectance of 10.65%, which is more than three times the reflectance.

In certain circumstances, it may be necessary to use materials with higher refractive indexes for window type applications. For example, some equipment used in a medical environment, particular for environments related to surgical procedures, must be sterilized, and kept sterile prior to use. One technique for sterilizing equipment involves exposing the product is exposed to gamma radiation. Such a technique can be particularly useful, for example, for the sterilization of equipment that includes multi-layer laminated lens stacks because the gamma radiation can penetrate the layers and sterilize the surfaces of the intermediary lenses of the stack. However, gamma radiation tends to cause certain materials to change in color or transparency. For example, gamma radiation tends to cause certain polymers, such as polycarbonate and poly methyl methacrylate (PMMA) to turn yellow, thereby making the product unsuitable, or at least less desirable, for use in certain medical applications. Materials like polyester (e.g., BoPet) may be able to withstand the gamma radiation treatment without discoloration, but these materials tend to have a higher refractive index and thus result in shields/windows that reflect more light and generate more glare. This increased glare can be a particular problem in environments where a surgeon or other caregiver wears a headlamp or light source under the shield to illuminate work areas, which is often done to maintain a sterile work environment. This increased glare can cause visibility issues for the caregiver that can lead to potential serious health and safety risks.

This application discloses a technique for reducing glare on optical webs and related products that can be used without using AR or other thin film coatings. The described applications reduce reflections by layering non-thin film coatings onto a substrate such that the coatings have lower refractive indexes than the substrate. Where more than one coating layer is used, the coatings are applied so that the refractive indexes decrease monotonically from the substrate toward the web-air interface. While the addition of coating layers may increase the number of interfaces that will generate reflections, smaller differences between the refractive indexes will result in less light being reflected at each interface. Because larger refractive indexes have a greater effect on reflectance, the monotonic layered configuration results in a reduction in light reflectance.

As noted, this application describes examples of optical webs and products made from optical webs. In this sense, webs refer to a long, thin, and flexible material. Webs can be continuous sheets, and a single web can have a significantly large surface area, particularly with respect to other optical components such as camera lenses, eyeglasses, and the like. The described optical webs and can be provided on a sheet or on a roll material, and can be subsequently converted into various optical products, such as lenses, windows, shields, covers, or the like. Alternatively, the described optical webs can refer to optical products that have already been cut or formed to shape. For example, the optical webs described herein can refer to a roll of web material, a sheet of web material, a face shield or windshield cut or shaped from web material, or the like.

The term "optical webs" as described herein may refer to a single web layer (not including coatings as a "layer" in this sense). The term may also refer to stacks formed from multiple optical webs laminated together to form stacks. In some cases, these optical web stacks are laminated in a manner that allows upper web layers to be peeled or torn away from the remaining layers. The individual optical web layers of the laminated stacks may be identical to one another, but in some cases they are different. For instance, the optical web may include stack having a base web layer and one or more releasable web layers laminated to the base layer. The base web layer may have a thickness, or a rigidity that is greater than that of the other web layers. In such a case, the resulting laminated optical web stack may be suitable to be used as a final product, such as a face mask, that can be applied to a garment like a hood, or inserted into a frame of a goggle assembly. Additionally and/or alternatively, the optical web product can be applied to pre-existing windows, such as a pre-existing goggle assembly or a pre-existing face mask, for example, via an adhesive applied to a lower level of the stack. Either way, whether applied to a pre-existing window or serving as a window itself, the individual layers of the stack can be laminated via a peelable adhesive that allows a user to peel away and remove the outer-most lens, thereby exposing a lower lens to provide a clear field of view.

The optical webs can be used in protective eyewear or other protective optical structures, such as goggles, face shields, masks, helmets, glasses, windows, windshields, or the like. The optical webs can be sterilized, for example, using chemical and/or gamma sterilization techniques, and used in a sterile environment, such as a surgical environment or the like. The optical webs are designed to replace other webs or substrates that are not coated in the manner descried herein, such that the optical web would reflect less light than the substrate alone.

In one example, an optical web comprises a substrate that includes an optical material (e.g., a polymer) that is clear or transparent. Throughout this application, the term "transparent" should be understood to refer to material that can be seen through. While the term may refer to material that is perfectly transparent, it also encompasses other see-through materials including tinted materials, colored materials, translucent materials, hazy or frosted materials, and the like.

The substrate has a refractive index value, which is typically larger than the refractive index of air, (i.e., about 1.00). The optical web includes first optical coating applied to one side (e.g., the anterior side) of the substrate. The first optical coating can also be made from an optical material (e.g., a polymer) that is clear, transparent, or otherwise see-through. The first optical coating has its own refractive index value, different from that of the substrate. For example, the first optical coating can have a refractive index value that is less than that of the substrate but still larger than 1.00.

In some examples, the first optical coating is also applied to the opposite side (e.g., the posterior side) of the substrate. However, in other examples, the opposing side may be coated with a different optical coating, or not coated at all. For instance, the opposite side of the substrate may be coated with a second optical coating having a different refractive index from that of the first optical coating, or it may be coated with an AR coating. This AR coating can be applied after conversion of a roll of an optical web to a final shape (e.g., a face shield) so that the AR coating need not be applied to the entire web.

The optical web may further include additional optical coating layers applied to the first optical coating and/or the second optical coating. For instance, the optical web may include a stack of two, three, four, or more optical coating layers applied on the substrate. Where multiple coating layers are applied, the coatings can be arranged so that the respective refractive indexes decrease monotonically from the substrate toward the outer layers.

FIGS. 1 and 2 show an embodiment of such an optical web 100. FIG. 1 provides an isometric view of the optical web 100, and FIG. 2 provides a side elevation view of the web 100. The optical web 100 includes a substrate 102, which can be formed from a variety of film materials. For instance, the substrate 102 can include or be formed from polycarbonate, acrylic, PMMA, polyethylene terephthalate (PET), biaxially-oriented polypropylene, or biaxially-oriented polyethylene terephthalate (BoPET), such as a product commercially known as Mylar,; for example.

The substrate can be of any thickness, but is generally at least thick enough so as not to be considered a thin film, that is, a film with a thickness on the order of the wavelength of visible light. For example, the thickness of the substrate is generally greater than 2 microns (2000 nm), but can also be considerably larger, for example, 0.05 mm (about 2 mils), 0.1 mm (about 4 mils), 0.2 mm (about 8 mils), 0.4 mm (about 16 mils) or larger. The substrate can be flexible or stiff, but is generally flexible enough to be applied through a lamination process and kept as a roll material. Depending on the material used, the substrate 102 will have a substrate refractive index value. The substrate refractive index will be larger than that of air (1.00). In some examples, the substrate refractive index will be larger than 1.46, or even 1.50, and in some examples, will be at least about 1.53. In some examples, such as when the substrate is formed from BoPET, the refractive index may be about 1.64 to about 1.67. As noted in table 1, substrates having a refractive index of 1.65 will have a total reflectance of 6.02% on one surface.

To reduce the reflectance, the optical web 100 comprises an anterior coating 104 coated on an anterior surface of the substrate. The anterior coating 104 is formed from a material that has a refractive index less than that of the substrate 102, though still larger than 1.00. For instance, the anterior coating 104 can be formed from a polymer or plastic material, such as PET, BoPET, PMMA, acrylic, silicones, flourimers, or polycarbonate.

The anterior coating 104 can be relatively thin compared to the substrate 102, but not so thin that it would be considered a thin film with a thickness on the order of the wavelength of visible light. For instance, the coating may be at least four times greater than the wavelength of visible light, and in some cases at least about 2 microns (i.e., 2000 nm) thick. In some instances, the anterior coating 104 may be considerably thicker, and may even have a thickness of about 1%, 10%, 25%, or 50% of that of the substrate 102. In some examples, the thickness of the anterior coating 104 (or any coating layer) will be negligible compared to the thickness of the substrate 102. In some instances, the coating may be an adhesive or a low surface energy material that facilitates the attachment of the web to another surface.

Generally, the coating 104 will be a transparent coating, and in some instances, may be clear and/or colorless. In some examples, the anterior coating 104 may be configured to provide additional properties. For example, the coating 104 may provide hardening or scratch resistant properties to the optical web 100.

The anterior coating 104 can have a refractive index between about 1.40 and about 1.50. In some examples, the anterior coating will have a refractive index no greater than about 1.46. In some examples, the anterior coating 104 may have a refractive index between about 1.33 and about 1.42. In other examples, the anterior coating 104 may have a refractive index as low as 1.30, or lower. The anterior coating 104 creates an interface with the substrate, which in turn generates a certain amount of reflectance. For example, where the refractive index of the substrate is 1.65, and the refractive index of the coating is 1.40, the total reflectance from the anterior side of the optical web 100 will be about 3.45%. This is determined by adding the reflectance generated by each interface between the coating and the substrate, and between the coating and air.

The interface between the coating and the substrate reflectance is calculated as:

$$R_1 = \left| \frac{1.65 - 1.40}{1.65 + 1.40} \right|^2 = 0.67\%$$

The interface between the coating and air reflectance is calculated as:

$$R_2 = \left| \frac{1.40 - 1.00}{1.40 + 1.00} \right|^2 = 2.78\%$$

The total reflectance is calculated by adding $R_1$ and $R_2$ to arrive at 3.45%.

Thus, the application of the anterior coating drops the reflectance by 2.57%, from 6.02% to 3.45%. This value is shown below in Table 2, which also shows the resulting reflectance in one direction when coatings having different refractive indexes are applied to a substrate having a refractive index of 1.65.

TABLE 2

| RI of Air | RI of Substrate | RI of Coating Layer | Reflectance % from coating to air interface | Reflectance % from coating to substrate interface | Total Reflectance (One Direction) |
|---|---|---|---|---|---|
| 1.00 | 1.65 | 1.25 | 1.23% | 1.90% | 3.14% |
| 1.00 | 1.65 | 1.30 | 1.70% | 1.41% | 3.11% |
| 1.00 | 1.65 | 1.33 | 2.01% | 1.15% | 3.16% |
| 1.00 | 1.65 | 1.35 | 2.22% | 1.00% | 3.22% |
| 1.00 | 1.65 | 1.40 | 2.78% | 0.67% | 3.45% |
| 1.00 | 1.65 | 1.42 | 3.01% | 0.56% | 3.57% |
| 1.00 | 1.65 | 1.45 | 3.37% | 0.42% | 3.79% |
| 1.00 | 1.65 | 1.46 | 3.50% | 0.37% | 3.87% |
| 1.00 | 1.65 | 1.50 | 4.00% | 0.23% | 4.23% |
| 1.00 | 1.65 | 1.52 | 4.26% | 0.17% | 4.43% |

Table 2 shows the reflectance from one side of the optical web 100, for example, the anterior side with a coating, but does not consider the reflectance from the opposing side of the optical web 100. To reduce reflectance on the opposite side, the optical web 100 may also include a posterior coating 106 on the posterior side of the substrate 102. FIGS. 1 and 2 also show such a posterior coating 106 coated on the posterior surface, which is opposite the anterior side.

Like the anterior coating 104, the posterior coating 106 is formed from a material that has a refractive index less than that of the substrate 102, but larger than 1.00. The posterior coating 106 (and all coatings and coating layers described throughout this application) may be formed from the same or similar materials that are described above with respect to anterior coating 104. For instance, the posterior coating 106 may be an adhesive or low surface energy material that allows the web to attach to another surface, such as a window. The posterior coating 106 may have similar parameters to the anterior coating 104, such as coating thickness, refractive index, color, and transparency. As with anterior coating 104, the posterior coating 106 has a thickness large enough to not be considered a thin film, but may nevertheless still be relatively thin (e.g., at least one micron thick). Where the posterior coating 106 has the same parameters as those described above for the anterior coating 104, then the total reflectance from the posterior side of the optical web 100 will be the same as that for the anterior side. In the above example, where the substrate has a refractive index of 1.65 and the posterior coating has a refractive index of 1.4, then the total reflectance from the posterior side will also be 3.45%, which would make the total reflectance of the optical web 6.90%. This is significantly reduced from the 12.033% reflectance of the substrate alone.

In other embodiments, the posterior coating 106 has different parameters (e.g., thickness, material, refractive index, etc.) from the anterior coating 104. For example, the posterior coating 106 can have a refractive index value between 1.40 and 1.50. In some instances, the posterior coating may have a refractive index no greater than about 1.46. The posterior coating 106 may have a refractive index between 1.33 and 1.42, and in some instances, may be as low as 1.30 or lower. In some examples, the posterior coating 106 may be or include an AR coating, for instance, where the coating can be applied to a relatively small surface area, and/or where the mitigation of reflections through the surface is important. In other examples, the optical web 100 may not have any posterior coating. In further examples, the posterior coating 106 and/or the anterior coating 104 may be further coated with an AR coating to further reduce reflections.

In some forms, the optical web 100 may include additional coating layers applied to the substrate. For instance, the optical web 100 may include two or more anterior coating layers and/or two or more posterior coating layers applied to the substrate. The multiple coating layers are applied in a manner such that successive outer layers have lower refractive indexes than the coating layers inward, or closer to the substrate. That is, the coating layers are applied to be monotonically decreasing in refractive index moving outward from the substrate.

FIG. 3 shows a side view of an example of an optical web 300 that utilizes multiple optical anterior and posterior coatings on a substrate 302. In particular, the optical web 300 includes a substrate 302, with a coating stack 310 applied to one side of the substrate 302. The coating stack 310 includes a plurality of coating layers, including a first coating layer 312 applied to the substrate and a second coating layer 314 applied on the first coating layer 312. The coating stack 310 is shown having just two layers, but more layers could be utilized, including three layers (as shown FIG. 4), four, five, or more layers. Moreover, as discussed above with respect to FIGS. 1 and 2, the coating stack 310 could have just one coating layer. In this embodiment, the second coating layer 314 serves as the outer most coating layer of the optical web.

The coating layers each have a different refractive index that decreases monotonically away from the substrate. That is, in FIG. 3, the refractive index of the first coating layer 312 is less than the refractive index of the substrate 302, but greater than the refractive index of the second coating layer 314. Where additional coating layers are applied to the coating stack 310, those successive coating layers will have refractive indexes that are less than those of the coating layer to which they are applied, such that the outer most coating layer will have the lowest refractive index of all the coating layers of the stack 310. Such an outermost coating layer would constitute the anterior (or posterior) surface of the optical web.

In some examples, one or more of the coating layers may be configured to provide additional properties. For example, one or more coating layers, in particular, the outermost coating layer may be a hard coating that provides scratch resistant properties to the optical web 300. The coating layers can also be used to provide anti-fogging properties, or anti-fingerprint properties. In some cases, the coatings themselves will not provide any other functionality, but may instead be further coated with an additional coating layers that is not considered a part of the coating stack 310 or the optical web 300. These additional functional coating layers may have refractive indexes that do not necessarily comply with the monotonically decreasing refractive index values of the web, but are nevertheless considered within the scope of the described examples.

When multiple coating layers are applied to an optical web, the reduction in reflectance can be even further reduced, as shown in Table 3. Specifically, Table 3 shows the reflectance that results from each interface of a two-layer coating stack applied to a substrate having a refractive index of 1.65.

TABLE 3

| RI of Air | RI of Substrate | RI of Inner Coating | RI of Outer Coating | Reflectance % Outer Coating to Air | Reflectance % Outer to Inner Coating | Reflectance % Inner Coating to Substrate | Total Reflectance % (One Direction) |
|---|---|---|---|---|---|---|---|
| 1 | 1.65 | 1.46 | 1.3 | 1.70% | 0.34% | 0.37% | 2.41% |
| 1 | 1.65 | 1.46 | 1.32 | 1.90% | 0.25% | 0.37% | 2.53% |
| 1 | 1.65 | 1.46 | 1.4 | 2.78% | 0.04% | 0.37% | 3.20% |
| 1 | 1.65 | 1.46 | 1.48 | 3.75% | 0.00% | 0.37% | 4.12% |
| 1 | 1.65 | 1.46 | 1.52 | 4.26% | 0.04% | 0.37% | 4.67% |
| 1 | 1.65 | 1.42 | 1.3 | 1.70% | 0.19% | 0.56% | 2.46% |

TABLE 3-continued

| RI of Air | RI of Substrate | RI of Inner Coating | RI of Outer Coating | Reflectance % Outer Coating to Air | Reflectance % Outer to Inner Coating | Reflectance % Inner Coating to Substrate | Total Reflectance % (One Direction) |
|---|---|---|---|---|---|---|---|
| 1 | 1.65 | 1.42 | 1.32 | 1.90% | 0.13% | 0.56% | 2.60% |
| 1 | 1.65 | 1.42 | 1.4 | 2.78% | 0.01% | 0.56% | 3.34% |
| 1 | 1.65 | 1.42 | 1.48 | 3.75% | 0.04% | 0.56% | 4.35% |
| 1 | 1.65 | 1.42 | 1.52 | 4.26% | 0.12% | 0.56% | 4.93% |

For the first five samples of Table 3, the inner coating (i.e., the lower-most coating applied to the substrate) has a refractive index of 1.46. For the second five samples, the inner coating has a refractive index of 1.42. Where the outer coating is monotonic (i.e., where the refractive index of the outer coating is less than that of the inner coating), the total reflectance is reduced from that of just a single coating layer. For example, in comparing the results of Table 2 for a coating layer of 1.46, which has a reflectance of 3.87 with those of Table 3 that use a monotonically decreasing refractive index outer polymer (i.e., coatings with RI of 1.3, 1.32, and 1.4), the total reflectance is always less than 3.87. However, where the outer coating layer is not a monotonic decrease (i.e., RI of 1.48 and 1.52), the reflectance is actually higher than if no second coating layer were applied. The same results hold true in comparing the reflectance for a coating of 1.42 in Table 2 with those that use an inner coating with an RI of 1.42 in Table 3.

In some examples of a two-coating stack, the interface between air and the outer coating provides the greatest index differential, thereby being the source for the greatest amount of reflectance. Accordingly, decreasing the outer coating layer, or the layer forming the anterior side (or the posterior side) of the optical web will have a maximum value. For instance, in some examples, the refractive index of the outer coating layer forming an anterior side of the optical web will be no greater than about 1.46. In other cases, the outermost coating forming the anterior side of the optical web will be no greater than 1.42, or even 1.40. In some instances, the refractive index of the outer coating layer will be between about 1.33 to about 1.42, which provides a suitably low refractive index while still allowing the coating to be readily formed from available materials. In some instances, the outer coating layer may be even less, though it may be costlier to generate coatings having lower refractive indexes. In one particular example, an optical web having a coating stack with two optical coating layers comprises a substrate with a substrate refractive index of at least about 1.53, and the first coating (i.e., the inner coating layer) has a refractive index of between about 1.44 and about 1.48, and the second coating (i.e., the outer coating layer) has a refractive index no greater than about 1.43.

As shown in Table 3, applying two monotonic decreasing coating layers further reduces the reflectance of the optical web. Applying more layers (e.g., three layers, four layers or more) will still further reduce the reflectance as long as the layers are applied in a monotonically decreasing manner. Thus, some examples of the optical webs described herein will include coating stacks that apply three, four, five or more coating layers on a substrate. There is no limit to the number of coating layers that can be applied.

Moreover, coating stacks having multiple coating layers can be applied on both sides of a substrate to further reduce reflectance. For example, FIG. 4 shows an optical web 400 including a substrate 402 that has an anterior coating stack 410 with three coating layers 412, 414, and 416 applied on an anterior side, and a posterior coating stack 420 with two coating layers 422 and 424 applied on the posterior side of the stack 420. The layers of each stack 410 and 420 are selected to have refractive indexes that decrease monotonically moving away from the substrate in either direction.

As noted above, some embodiments include a laminated stack of tear-off lens layers, whereby each of the lens layers is formed from an optical web consistent with one of the examples described above. That is, the lens layers of the stack are formed with a substrate having at least one coating layer, whereby the coating layers have refractive indexes that monotonically decrease moving outward.

FIG. 5 shows an example of a laminated optical web 500 comprising five separate layers, including a base layer 501, and four removable layers 502a-d, each held together via a peelable adhesive 510a-d. Each of the removable layers 502n and the base layer 501 can have a configuration consistent with any of the examples of optical webs described herein. That is, (though not specifically shown in the Figure) each individual layer of FIG. 5 includes a substrate and at least one first coating layer (e.g., on the anterior side), where the coating layer has a lower refractive index than that of the substrate. Each layer can also include a second coating layer on the opposite side of the substrate from the first coating layer (e.g., on the posterior side). Further, each coating layer can include a coating stack comprising multiple coating layers with refractive indexes that reduce monotonically moving outward from the substrate.

It should be noted that while the example stack 500 is shown having a single base layer 501 and four releasable layers 502n, other examples can include more or fewer releasable layers 502, such as two, three, four, ten, twenty, fifty, or more layers, depending on the intended application and use for the stack 500.

Adhesive layers 510n are applied between the various layers of the lens stack 500. The adhesive layers 510n can be formed from an adhesive that allows an upper layer to be peelably released from the lower layer. The adhesive layers 510 can also be configured to remain with the released layer to avoid leaving an adhesive residue on the newly exposed surface. For example, when releasable layer 502d (i.e., the outermost layer) is peeled away from the stack, adhesive layer 510d will remain attached to released layer 502d so that little or no adhesive residue remains on the outer surface of the newly exposed layer 502c. The adhesive forming the adhesive layers 510n can be or can comprise an acrylic adhesive, silicone, or another adhesive that provides for a peelable adhesion between layers.

The adhesive is also selected to have refractive index that is closely matched to the refractive index of at least one of the substrate and/or the coating layers of the releasable layers 502n and the base layer 501. For example, the adhesive can be selected to have a refractive index that is matched to within about 0.2 of the refractive index of the substrate. In other examples, depending on the amount of reflectance desired, the adhesive is selected to have a refractive index that has an even tighter match to the refractive index of the substrate, for instance to within about 0.15, 0.12, 0.10, 0.08, 0.05, or 0.02. Matching the refractive index of the substrate of the releasable layers 502n and the base layer 501 helps mitigate internal reflections caused by the interfaces between the optical web layers and the adhesive.

An attaching adhesive 520 may be applied to a lower surface of the base layer 501. The attaching adhesive 520 is configured to attach the lens stack 500 to a surface such as a window, shield, or display, so as to protect the surface. The attaching adhesive 520 may be configured to have a stronger peel force than the releasable adhesive layers 510n such that the lens stack 500 remains solidly adhered to the surface even when the releasable layers are peeled away. The attaching adhesive layer 520 may be configured to form a more "permanent" adhesion, but in some examples, the attaching adhesive layer 520 is also configured to be releasable, such that the adhesive 520 remains with the base layer 501 when the base layer and/or the lens stack 500 is removed from the surface. In some examples, the attaching adhesive layer 520 may be the same as the releasable adhesive layers 510n. Some examples of the lens stack 500 may include protective liner 525 that protects the attaching adhesive 520 prior to its application onto a surface. The attaching adhesive 520 may be a self-wetting or dry mount adhesive that facilitates removal of air between the stack 500 and the surface after application, for example, by applying pressure across the surface of the stack. Examples of such a self-wetting/dry mount adhesive are described in U.S. Pat. No. 9,295,297, which is hereby incorporated by reference in its entirety. The refractive index of the attaching adhesive may also be matched to the refractive index of the components optical webs 501 and 502n and/or the releasable adhesive layers 510n (e.g., to within about 0.2 about 0.12, about 0.02, etc.).

Some examples of the lens stack 500 will not include an attaching adhesive 520 or a liner layer 525. In such an example, the lens stack may be configured to serve as a window (e.g., a face shield, eye shield, or other optical device) itself, without attaching to another surface. In some examples, the base layer 501 of the stack 500 may have a thickness that is greater than that of releasable layers 502n to provide added stiffness/rigidity to the stack 500. For example, the base layer may have a thickness of about 0.2 mm (about 8 mils), and the releasable layers 502 may have a thickness of about 0.05 mm (about 2 mils). In another example, the base layer 501 has a thickness of about 0.1 mm (about 4 mils), and the releasable layers 502 have a thickness of about 0.05 mm (about 2 mils). In general, the thicknesses of the various layers can vary widely depending on the intended application of the lens stack 500. For example, either the base layer 501 or the releasable lens layers 502 may have thicknesses in the range between about 0.025 mm (about 1 mil) and 0.4 mm (about 16 mils), or larger. In some examples, the thicknesses of the various releasable layers 502 can also vary.

Figure 6A:
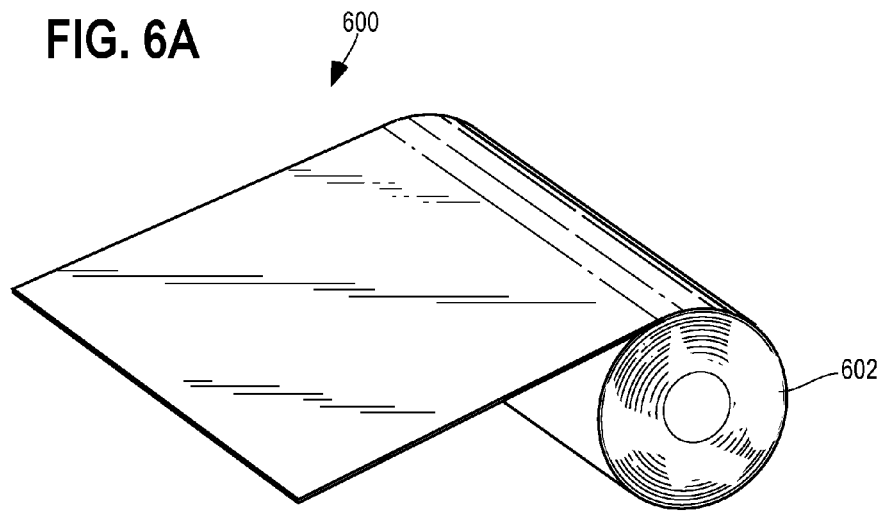
FIG. 6A shows a roll of optical web material in accordance with examples described herein.

The optical webs and lens stacks described herein can be used to form various optical devices, such as shields for protecting a wearer's face and eyes or for protecting display surfaces, such as for smart phones and tablets, televisions, or other screens. The optical webs can be formed as a rolled sheet or stack of material, as shown in FIG. 6A. Specifically, FIG. 6A shows an optical web 600 provided as a roll 602 of material wound about an axis. The optical web 600 can be any of the optical webs described herein, or it may include a stack of optical webs laminated together as shown with respect to FIG. 5. The optical web 600 on the roll 602 can subsequently be processed by being laminated with other webs, or by being converted from the sheet.

Figure 6B:
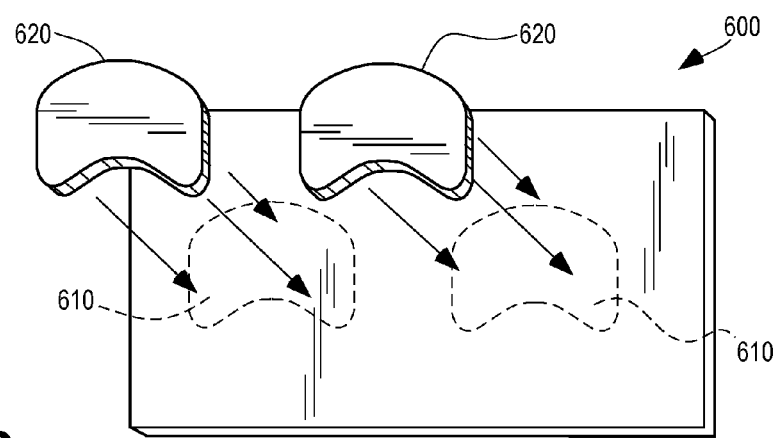
FIG. 6B shows the optical web material of FIG. 6A being converted into optical windows.

FIG. 6B shows an example of the optical web 600 being cut by stamping devices 620, which press down on the web 600 to cut and form two optical devices 610, which can form a window or shield, for example. In some examples, the optical device 610 can then be attached to components that are used for other purposes, such as a frame for an eye protector, or a garment, sheath, or other material used to protect a wearer.

Figure 6C:
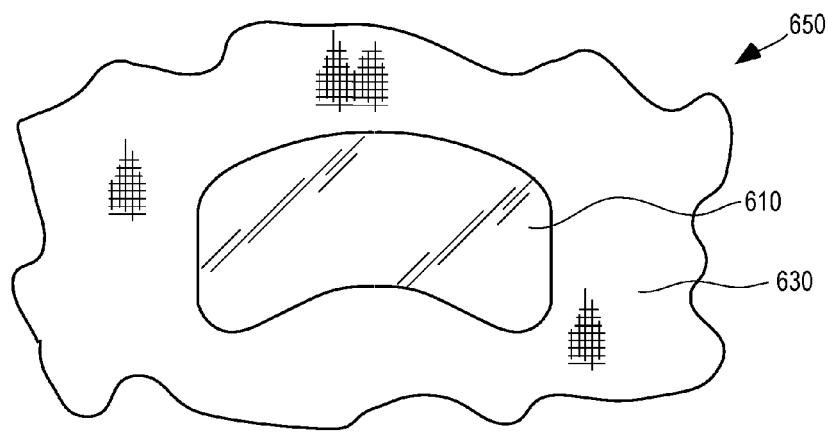
FIG. 6C shows the optical windows of FIG. 6B being attached to a garment.

FIG. 6C shows an example of the optical shield 610 attached to a material 630 such that the garment surrounds the shield 610. The material 630 can be used to form, for example, a medical garment used to protect medical caregivers in a surgical environment. The material 630 may include a breathable fabric that can be formed into a covering that is designed to be sterilized and placed over a wearer's head and used during surgery. Because the optical shield 610 is formed from the low reflectance optical webs described herein, the medical caregiver can have an improved visibility throughout while performing the surgery. Moreover, because the reduced reflectance is achieved without requiring the use of costly AR coatings or other thin film features, the shields can be cost-effectively mass produced on roll stock as described herein. Further, the optical webs and garments can be formed from higher index polyester materials that are capable of being sterilized using a variety of sterilization techniques (e.g., gamma radiation), without being subjected to deformation, discoloration, or other visibility impairing issues. That is because the described webs can be formed from substrates that have higher refractive indexes capable of withstanding sterilization techniques like gamma radiation, while reducing the glare and other issues that would otherwise result from the use of a higher index material.

In medical settings, spatter and other projectiles in the form of biological material can be a hazard, for instance, where procedures involve aggressive sawing or cutting actions that cause bone, tissue, blood, and/or other fluids to project toward the face and eyes of the caregivers. In such situations, the medical caregivers (e.g., doctors, surgeons, nurses, technicians, etc.) may wear protective garments in the form of goggles, masks, or the like, to protect their eyes. As such, it can be useful to provide the protective garments, such as garment 650 disclosed with respect to FIG. 6C, with a shield 610 that is in the form of a laminated tear-off stack as described herein. Using the laminated stacks helps the caregiver to retain a clear, unsoiled field of vision, but because these stacks often include several layers, the interfaces between these layers can create reflections that increase the glare through the shield, making it difficult for the caregiver to see with the visual acuity necessary to perform the medical tasks. This is particularly true where the caregiver is wearing a lighting device underneath the garment, which is often necessary to ensure the sterility of a medical or surgical environment. Using the reduced reflectance technology described herein, the amount of reflections can be reduced, thereby limiting glare and improving the viewability through the garment.

This application also describes examples of methods and processes for making the optical webs and other garments described herein. FIGS. 7A and 7B are flow diagrams of methods for manufacturing an optical web. FIG. 7A shows an example of one method 700 of forming an optical web coated on both the anterior and posterior side. First, a substrate is provided 702 or obtained. The substrate can be provided as a roll of material, or as an individual component. The substrate can be generally transparent, and will have a refractive index. For instance, the substrate can include PET, BoPET, polycarbonate, acrylic, or another polymer. A coating is then applied 704 to an anterior side of the substrate. The coating can be any of the coatings described herein. The coating is selected to have a refractive index that is less than that of the substrate. A posterior coating is also applied 706 to the posterior side of the substrate. The posterior coating can be the same as the anterior coating, or it can be different, but the refractive index of the posterior coating is less than that of the substrate. In some examples, both the anterior coating and the posterior coatings are coating stacks that include two or more coating layers with monotonically decreasing refractive indexes. Providing coatings in this manner on both sides of the substrate decreases reflectance from each side of the optical web. It should be noted that in method 700, the coatings can be applied in no particular order. For example, the anterior coating can be applied 705 before, after, or concurrent with the application 706 of the posterior coating layer.

FIG. 7B shows an example of a method 750 that applies a stack comprising a plurality of coating layers to one side of an optical web. First, a substrate is provided 752 or obtained. As with step 702 of method 700, the substrate can be provided as a roll of material, or as an individual component. The substrate can be generally transparent, and will have a refractive index. For instance, the substrate can include PET, BoPET, polycarbonate, acrylic, or another polymer. A first coating is then applied 654 to either an anterior or posterior side of the substrate. The coating can be any of the coatings described herein. The coating is selected to have a refractive index that is less than that of the substrate. A second coating layer is applied 756 to the first coating layer. The second coating layer has a refractive index less than that of the first coating layer and the substrate. Further coatings can be applied to the web in subsequent steps, such that the coatings have refractive indexes that decrease monotonically away from the substrate. In some examples, rather than applying a layer first to the substrate, the method 750 may first include forming a stack of multiple coating layers having monotonically decreasing refractive indexes, and then applying the stack of coating layers to the substrate. In other examples, a coating layer or a coating stack can also be applied to the opposite side of the substrate.

In some examples, the webs made by the described methods can be laminated together to form laminated tear-off stacks and/or cut or converted to form optical devices such as shields and windows. In further examples, additional coating layers, such as hard coats, scratch resistant coatings, anti-fingerprint coatings, anti-glare coatings, matte coatings, friction reducing coatings, or the like can be applied to the optical webs. These additional functional coatings may be a part of the monotonically reducing refractive index coating stacks, or they may be separate coatings that do not necessarily have refractive indexes lower than the outermost layer of the web.

FIGS. 8A and 8B are diagrams comparing the reflectance of two optical webs. In FIG. 8A, an optical web 800a comprises only a substrate 802a. The substrate 802a forms a first interface A with the air and a second interface B with the air. Each of these interfaces creates a reflection that reflects light back toward an eye 10 of a wearer. The reflections are represented by vectors 831 and 832. Because the substrate has no coating, the reflectance will depend on the difference in the refractive index between the substrate (e.g., 1.65 for an uncoated Mylar) and air (about 1). Each surface will generate a separate reflection. Because the difference in refractive indexes is relatively high, each surface will generate a relatively high percentage of light, which will depend on the specific refractive index and the angles of incidence and refraction. For normal incidence angles and a substrate having a refractive index of 1.65, reflectance values are demonstrated in Table 1.

FIG. 8B shows an optical web 800b having coating stacks 810 and 820 applied on both sides of a substrate 802. Each coating stack has two coating layers, for instance, the anterior coating stack includes an inner anterior coating layer 822 and an outer anterior coating layer 824. And the posterior coating stack 810 includes an inner posterior coating layer 812 and an outer posterior coating layer 814. The layers are arranged so that the refractive indexes of the coatings decrease monotonically moving away from the substrate 802. That is, the inner anterior coating layer 822 refractive index is less than that of the substrate 802, but greater than that of the outer anterior coating layer 824. Likewise, the inner posterior coating layer 812 is less than that of the substrate 802, but greater than that of the outer posterior coating layer 814. The layers forming the anterior stack 820 and the posterior stack 810 may be the same and may have the same refractive index values, but they may also be different from one another. FIG. 8B also shows that each interface, between air and the outer coating layers, between the inner and outer coating layers, and between the inner coating layers and the substrate each generate a reflection depicted by a vector line (841-846). Because the refractive index of the outer coating layers 814 and 824 are less than that of the substrate, and therefore closer to the refractive index of air (about 1), the resulting reflections 841 and 846 will be less than those of reflections 831 and 832 from FIG. 8A. As explained above with respect to Table 3, the resulting reflections from the remaining interfaces will contribute some reflectance, but the resulting reflectance is still less than that of the embodiment of FIG. 8A.

The described examples provide a low-cost reflectance reducing coatings for disposable polymer lenses, in particular, lenses that can be processed on a roll to roll web. The described webs are suitable for use as disposable lenses for use in sterile surgical environments, which are most cost effective when processed by roll to roll web processes. The lens substrate of choice for such applications is a polyester because it does not discolor from gamma sterilization as does other lens material such as polycarbonate and PMMA (Acrylic). And while polyester (e.g., BoPET) handles effectively in roll to roll web processing and can be gamma sterilized, the high index of refraction of polyester can cause higher levels of unwanted reflection, for example, in the range of about 12-13% or even higher. The reflection is a significant distraction to the user of the lens system. The described techniques and webs allow for the production of a cost-effective, disposable, low reflection lens system that also meet the other useful criteria in the medical field and other environments. The described embodiments can be employed without utilizing AR coatings formed from thin films as described above.

As noted above, this application claims priority to, and incorporates by reference U.S. provisional patent application No. 62/367,845, which relates to touch screen protectors and shields that have an AR coating applied to an underside of the protector, such that, when applied, the surface of the shield with the AR coating faces the touch screen. Examples of such screen shields and protectors are described further below.

In some examples, touch screen protective shields are configured to adhere to the touch screen around a peripheral edge of the touch screen. The central portion of the shield is generally free of adhesive, and thus does not adhere to the active display portion of the shield. The central portion of the shield may be lifted off or spaced away from touch screen, for example, by way of a thick border adhesive, an annular spacer layer, and/or tension applied to the shield when being attached to the touch screen.

An AR coating is applied to the underside of the shield, i.e., the shield surface that faces the touch screen when attached thereto. The AR coating inhibits formation of Newton rings and other unsightly interference patterns that may otherwise result when two surfaces (e.g., the inner surface of the shield and the touch screen surface) come into contact or close proximity with one another. Because the AR coating is provided on the underside surface of the shield, it remains protected by the outer surface of the shield, the adhesive, and the touch screen itself, and thus is not subject to fingerprints, smudging, breaking, or other damage that can otherwise occur on AR coatings.

One example of such a protective shield includes a shield for an electronic device, where the electronic device has a touch screen with a display area surrounded by a border region. The shield has an inner side and an outer side, and the shield defines a perimeter portion that corresponds to the border region of the touch screen and a central portion that corresponds to the display area of the touch screen, whereby the perimeter portion surrounds the central portion. The shield comprises a base layer having an outer surface and an inner surface. The shield also comprises an adhesive layer applied about the perimeter portion of the inner side of the shield, and an AR coating applied to the inner side of the shield. The shield, the perimeter portion of the shield, the central portion of the shield, and the applied adhesive layer are configured to attach the shield to the touch screen of the device so that the adhesive layer is disposed on the border region of the touch screen, so that the display area of the touch screen is visible through the central portion of the shield, so that the inner surface of the base layer does not adhere to the display area of the touch screen, and so that the touch screen maintains touch sensitivity through the attached shield.

In some embodiments, the AR coating on the shield is configured to inhibit the reflection of at least some light that projects from the touch screen by the shield. The AR coating may also be configured to inhibit the appearance of interference patterns. In some forms, the AR coating is configured so that it is not detectable to a human eye when attached to the touch screen, and/or so that touch sensitivity of the touch screen is not inhibited.

The base layer of the shield may comprise glass, and the AR coating may be applied to the shield at a high temperature so as to increase the durability of the AR coating. Alternatively, the base layer may include a flexible film material, such as a plastic material, e.g., PET. In some forms, the AR coating can be applied at a cool temperature. The AR reflective coating may be fragile or otherwise subject to absorb damage when exposed to frequent touching. The AR coating may include multiple layers (e.g., 8 layers), and individual ones of the multiple layers may be configured to inhibit the shield from reflecting light having a particular range of wavelengths.

In some examples, base layer is flexible and configured to conform to a touch screen having a curved surface.

The shield may be configured to be removable from the touch screen. In some examples, the adhesive layer and the outer surface of the base layer are configured to protect the AR coating from coming into contact with environmental objects.

The shield may include a hard coat on the outer side of the shield. The base layer may comprise a hard coat on the outer surface of the base layer.

In some forms, the AR coating is applied directly to the inner surface of the base layer. Further, the AR coating may be applied only to the central portion of the shield.

In some embodiments, the shield comprises a mask layer applied about the perimeter portion of the shield. The mask layer may be is opaque and is configured to hide, mask, or disguise optical artifacts generated between the border region of the touch screen and the shield. The mask can be about 0.2 mils thick. In some examples, the adhesive layer is applied to the mask layer.

In some examples, the base layer comprises a plurality of layers. For instance, the base layer may include comprises an outer base layer laminated to an inner base layer. The outer base layer can be formed from PET and have a hard coating on the outer surface of the base layer. The outer base layer may be about 3 to about 4 mils thick in some embodiments. For example, the outer base layer can be about 3.5 mils thick. The inner base layer can be formed from PET and comprises an AR coating on the inner surface of the base layer. The inner base layer can be about 3 to about 4 mils thick, for instance, about 3.5 inches thick.

The base layer can comprise or be formed from at least two different materials. The base layer can have a beveled edge.

In some examples, the adhesive layer comprises a carrier. The adhesive layer can be about 3 to about 4 mils thick, for instance, about 3.5 mils thick.

The total thickness of the shield itself, in some embodiments, is about 10 to about 11 mils thick. In some forms, the shield is about 0.0107 inches thick.

Some examples of the shield include cutouts that correspond to features on the touch screen, such as cutouts that correspond to one or more of a light, a speaker, and a button on the touch screen.

The shield is configured so that the touch screen maintains touch sensitivity through the attached shield. In some examples, at least a portion of the perimeter portion of the shield is opaque to mitigate visibility of optical artifacts between the touch screen and the attached shield. For example, at least one of a perimeter portion of the base layer or the adhesive may be opaque.

In some examples, the adhesive layer is sufficiently thick to lift the inner surface of the base layer off the display area of the touch screen. In some embodiments, wherein the adhesive layer is configured to trap air between an attached shield and the display area of the touch screen, and the trapped air can be configured to form a planar air bearing.

In some examples, the shield comprises a spacer interposed between the inner surface of the base layer and the adhesive layer. The shield can be arranged so that, wherein the combined thickness of the spacer layer and the adhesive layer is sufficient to lift the inner surface of the base layer off the display area of the touch screen.

In some examples, the electronic device is arranged so that a majority of the active area and the inactive area of the touch screen share a common plane, and wherein a lower surface of the central portion of the base layer of an attached shield is in a different plane from that shared by the majority of the active area and the inactive area.

In some examples, the AR coating comprises at least one layer, and wherein individual ones of the at least one layer have a thickness that is about one quarter of the wavelength a particular type of visible light. The AR coating may include a ceramic substance. The AR coating can include multiple layers, (e.g., 8 layers). In some forms, the various layers of the AR coating each have a width that corresponds to a particular wavelength of light in the spectrum of visible light. In some examples, each of the layers of the AR coating have a different wavelength.

Examples of such shields are shown and described in U.S. provisional patent application No. 62/367,845, which is hereby incorporated by reference in its entirety, and to which this application claims priority.

This application describes preferred embodiments and examples of optical webs with coatings designed to reduce the refraction and reflection of light. Those skilled in the art will recognize that a wide variety of modifications, alterations, and combinations can be made with respect to the above described embodiments without departing from the scope of the invention as set forth in the claims, and that such modifications, alterations, and combinations are to be viewed as being within the ambit of the inventive concept. In addition, it should also be understood that features of one embodiment may be combined with features of other embodiments to provide yet other embodiments as desired. In particular, it should be understood that all embodiments described herein can be applied to, and used in connection with the embodiments of other tear-off lens configurations. All references cited in the present disclosure are hereby incorporated by reference in their entirety, as are all references that are, in turn, incorporated by reference in those references.

The invention claimed is:

1. An optical web comprising:
a substrate having a substrate refractive index, the substrate having an anterior side and an opposing posterior side;
an anterior coating including a first anterior layer applied to the anterior side of the substrate, the first anterior layer having a first anterior layer refractive index,
a posterior coating including a first posterior layer applied to the posterior side of the substrate, the first posterior layer having a first posterior layer refractive index,
wherein the substrate refractive index is greater than the first anterior refractive index and the first posterior refractive index and wherein the first anterior layer comprises a polymer with a low index of refraction.

2. The optical web of claim 1, wherein the anterior coating comprises a second anterior layer applied to the first anterior layer, the second anterior layer having a second anterior refractive index that is less than the first anterior refractive index.

3. The optical web of claim 2, wherein the posterior coating comprises a second posterior layer applied to the first posterior layer, the second posterior layer having a second posterior refractive index that is less than the first posterior refractive index.

4. The optical web of claim 1, further comprising an adhesive layer laminated to at least one of the anterior or posterior side, the adhesive layer comprising a refractive index matched to within about 0.2 of the substrate refractive index.

5. The optical web of claim 1, wherein the anterior coating comprises a plurality of coating layers, individual coating layers having individual refractive indexes, wherein the individual coating layers are arranged so that the individual refractive indexes of successive individual coating layers decrease in a monotonic function from the base layer toward an anterior side of the optical web.

6. The optical web of claim 5, wherein the substrate refractive index is at least about 1.53, and wherein the individual refractive index of an individual coating layer forming the anterior side of the optical web is no greater than about 1.46.

7. The optical web of claim 6, wherein the first anterior layer refractive index is between about 1.40 and about 1.50.

8. The optical web of claim 5, wherein the substrate refractive index is about 1.64 to about 1.67, and wherein the individual refractive index of an individual coating layer forming the anterior side of the optical web is about 1.33 to about 1.42.

9. The optical web of claim 1, wherein the optical web is wrapped about an axis to form a roll of web material.

10. The optical web of claim 1, wherein the substrate comprises biaxially-oriented polyethylene terephthalate.

11. The optical web of claim 1, wherein the substrate comprises polycarbonate or acrylic.

12. The optical web of claim 1, wherein the substrate has a thickness of at least about 2 microns.

13. The optical web of claim 12, wherein the first anterior layer and the first posterior layer have a thickness greater than about 2 microns.

14. A shield for a garment comprising a cut portion of the optical web of claim 1.

15. The shield of claim 14, wherein the shield has been sterilized using gamma radiation.

16. The shield of claim 15, wherein the shield is colorless after being sterilized using gamma radiation.

17. An optical web comprising:
a substrate having a substrate refractive index;
a first coating layer applied to the substrate, the first coating layer having a first coating refractive index;
a second coating layer applied to the first coating layer so that the first coating layer is positioned between the substrate and the second coating layer, the second coating layer having a second coating refractive index; and
a third coating layer applied to the second coating layer so that the second coating layer is positioned between the first coating layer and the third coating layer, the third coating layer having a third coating refractive index,
wherein the first coating refractive index is greater than the second coating refractive index,
wherein the substrate refractive index is greater than the first coating refractive index,
wherein the second coating refractive index is greater than the third coating refractive index, and
wherein each of the first, second, and third coating layers is at least 2 microns thick.

18. The optical web of claim 17, further comprising a posterior coating layer applied to the substrate, the posterior coating layer having a posterior coating refractive index, wherein the posterior coating refractive index is less than the substrate refractive index.

19. The optical web of claim 17, wherein the optical web is further coated with at least one of a scratch resistant coating, an anti-fog coating, an anti-fingerprint coating, a matte coating, a hard coating, or an anti-glare coating.

20. An optical web comprising:
a substrate having a substrate refractive index;
a first coating layer applied to the substrate, the first coating layer having a first coating refractive index;
a second coating layer applied to the first coating layer so that the first coating layer is positioned between the substrate and the second coating layer, the second coating layer having a second coating refractive index; and a third coating layer applied to the second coating layer so that the second coating layer is positioned between the first coating layer and the third coating layer, the third coating layer having a third coating refractive index, wherein the first coating refractive index is greater than the second coating refractive index, wherein the substrate refractive index is greater than the first coating refractive index, wherein the second coating refractive index is greater than the third coating refractive index, and wherein the substrate refractive index is at least about 1.53, wherein the first coating refractive index is between about 1.44 and about 1.48, and wherein the second coating refractive index is no greater than about 1.43.

21. A laminated optical web comprising:
a base web layer;
a removable layer stack including at least one removable layer; and
an adhesive layer laminating the removable layer stack to the base web layer,
wherein the base web layer and each removable layer of the removable layer stack include:
a substrate having a substrate refractive index; and
a coating including a first coating layer applied to an anterior side of the substrate, the first coating layer formed from a first coating material having a first coating refractive index;
wherein the substrate refractive index is greater than the first coating layer refractive index,
wherein each removable layer of the removable layer stack is configured to be peelably removed from the laminated optical web, and
wherein the adhesive layer is applied so that a majority of the adhesive layer remains attached to a posterior surface of the removable web layer as the removable web layer is peeled from the laminated stack of multi-layer optical webs.

22. The laminated optical web of claim 21, wherein the adhesive layer has an adhesive refractive index matched to within about 0.2 of the substrate refractive index.

23. The laminated optical web of claim 21, wherein the base layer further comprises a posterior coating including a first posterior layer applied to a posterior side of the substrate, the first posterior layer having a first posterior layer refractive index, wherein the first posterior layer refractive index is less than the substrate refractive index.

24. The laminated optical web of claim 21, wherein the base layer further comprises an anti-reflective coating applied to a posterior side of the substrate.

25. The laminated optical web of claim 21, wherein the removable layer stack includes a plurality of removable web layers peelably attached to one another via an intermediary adhesive layer applied between individual web layers, wherein each intermediary adhesive layer has an intermediary adhesive refractive index matched to within about 0.2 of the substrate refractive index.

26. The laminated optical web of claim 21, wherein the coating of the base layer comprises a second coating layer applied to the first coating layer, the second coating layer formed from a second coating material having a second coating refractive index that is less than the first coating refractive index.

27. The laminated optical web of claim 26, wherein the removable layer stack includes a plurality of removable web layers, and wherein the coatings of each removable layer further comprise a second coating layer applied to the first coating layer, the second coating layer formed from the second coating material.

28. The laminated optical web of claim 21, wherein the base web layer has a thickness that is greater than a thickness of each removable layer of the removable layer stack.

29. The laminated optical web of claim 28, wherein the laminated optical web is cut to form a shield, wherein the shield is sterilized using gamma sterilization and attached to a garment.

30. The laminated optical web of claim 21, wherein the substrate of the base web layer and each removable layer of the removable layer stack has a thickness of at least about 20 microns.

31. The optical web of claim 21, wherein the substrate refractive index is at least about 1.55, and wherein the first coating refractive index is no greater than about 1.46.

32. The optical web of claim 21, wherein the anterior coating comprises a second anterior layer applied to the first anterior layer, the second anterior layer having a second anterior refractive index that is less than the first refractive index.

33. A method of manufacturing a laminated optical structure comprising:
applying an anterior coating to an anterior side of a substrate;
applying a posterior coating to a posterior side of a substrate to form an optical structure;
laminating at least two optical structures together via an adhesive layer, the adhesive layer configured to allow one optical structure to be peelably removed from the other,
wherein the anterior coating includes a first anterior layer applied to the anterior side of the substrate, the first anterior layer having a first anterior layer refractive index,
wherein the posterior coating includes a first posterior layer applied to the posterior side of the substrate, the first posterior layer having a first posterior layer refractive index,
wherein the substrate refractive index, the first anterior layer refractive index, and the first posterior layer refractive index are greater than 1.00,
wherein the substrate refractive index is greater than the first anterior refractive index and the first posterior refractive index, and
wherein the adhesive layer has an adhesive refractive index matched to within about 0.2 of the substrate refractive index.

34. The method of claim 33, further comprising cutting the laminated sheet to form an optical shield, and attaching the optical shield to a garment.

35. The method of claim 34, wherein the optical shield is sterilized using gamma radiation, and remains colorless after sterilization.

* * * * *